Aug. 21, 1928.

J. V. PUGH 1,681,432

WHEEL BRAKE FOR VEHICLES

Filed Sept. 7, 1926    3 Sheets-Sheet 1

J. V. Pugh
inventor
By Marks & Clerk
Attys

Aug. 21, 1928.
J. V. PUGH
1,681,432
WHEEL BRAKE FOR VEHICLES
Filed Sept. 7, 1926   3 Sheets-Sheet 2
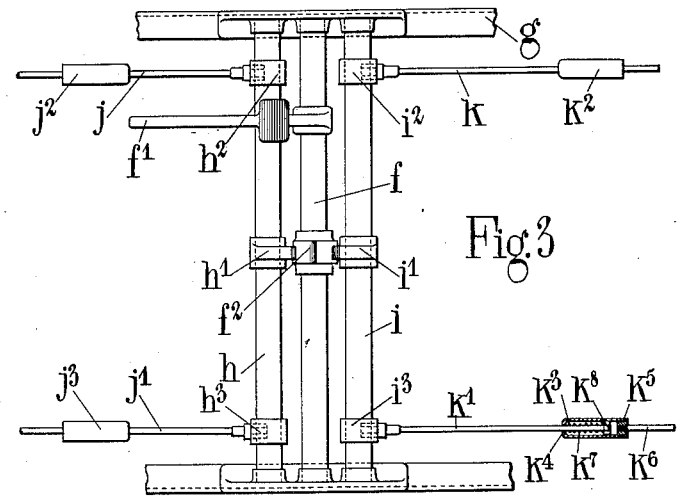
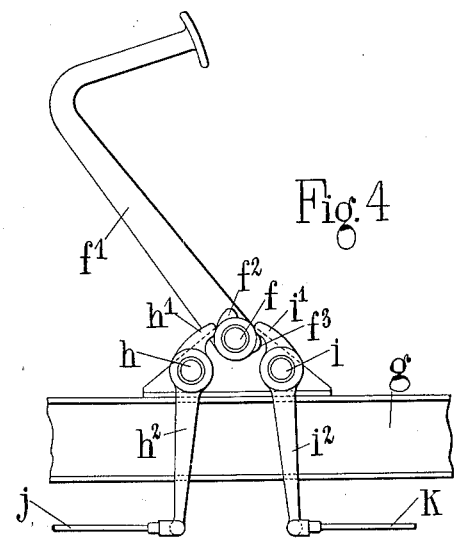
J. V. Pugh, Inventor
By: Marks & Clark, Attys.

Aug. 21, 1928.
J. V. PUGH
1,681,432
WHEEL BRAKE FOR VEHICLES
Filed Sept. 7, 1926     3 Sheets-Sheet 3
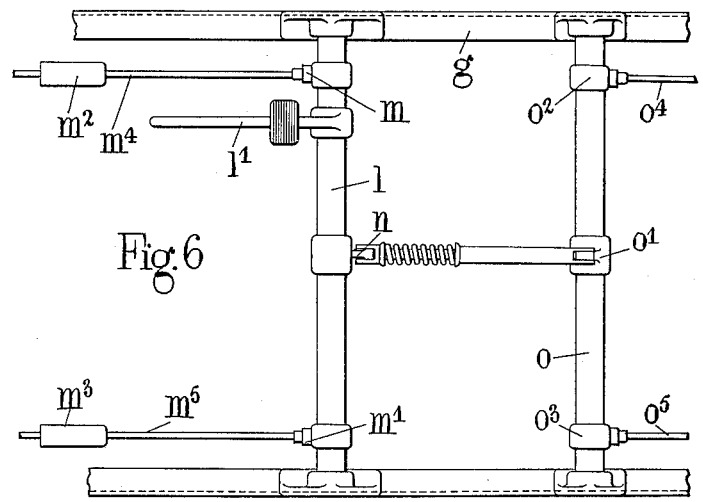
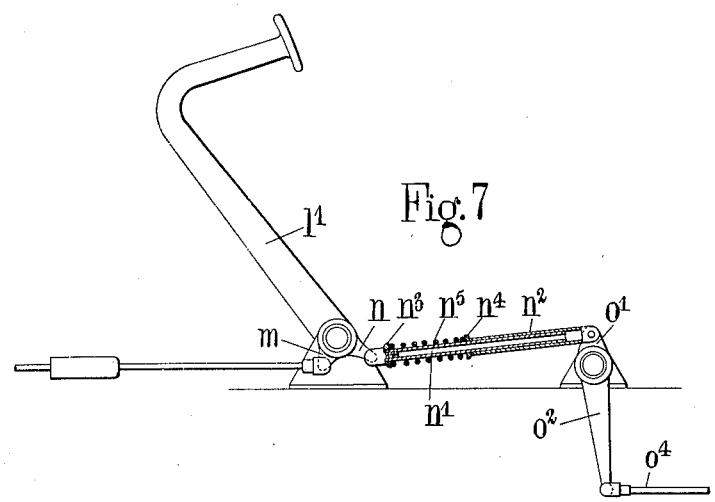
J. V. Pugh, Inventor
By: Marks & Clark, Attys Patented Aug. 21, 1928.

1,681,432

UNITED STATES PATENT OFFICE.

JOHN VERNON PUGH, OF COVENTRY, ENGLAND, ASSIGNOR TO RUDGE-WHITWORTH, LIMITED, OF COVENTRY, ENGLAND.

WHEEL BRAKE FOR VEHICLES.

Application filed September 7, 1926, Serial No. 134,036, and in Great Britain September 18, 1925.

This invention relates to braking gear for vehicle wheels of the kind in which power is applied to a member, such as a pedal, hand lever or the like, and is from thence transmitted to braking appliances fitted to both the front and rear wheels of a vehicle, the transmission system embodying resilient devices providing for varying apportionments of the forces in a manner adapted to afford desirable results in retarding a vehicle.

When applying brakes to the wheels of a vehicle, the force of retardation acting at the surface of the ground and the momentum of the vehicle acting at the height above the ground of the centre of gravity of the vehicle create a couple which has a tendency to tip up the vehicle and throw more load on the wheels that are in front and consequently less on those that are behind and the amount of the retardation will control the redistribution thus brought about. Further, in order to obtain the best results when applying brakes the actual skidding of a wheel should be avoided and the grip of the brake should not be such that rotation of a wheel is entirely prevented. The gripping action on any wheel should, therefore, be in accordance with the retarding effect which the particular wheel can exert upon the vehicle and this again will depend upon the coefficient of friction between the tyre and the ground.

The object of the present invention is to control with greater exactitude the variation of the apportionment of the braking force between front and rear wheel brakes in view of the foregoing considerations.

The invention consists in a method of applying braking forces to the wheels on both the forward and rear ends of a vehicle according to which an application of power to a pedal, hand lever or the like results first in substantially equal gripping forces being exerted on the wheels at both ends with a rapidly increasing predominance of the forces at the front end as the total power applied increases until the back wheel gripping forces reach a maximum when about one-half of the total braking power has been applied after which a reduction of the force transmitted to the back wheels commences and continues until when the whole of the total braking power is applied all the force is transmitted to the front wheel brakes.

The invention further consists in a braking gear for operating in accordance with the preceding paragraph and comprising cam or like members which in combination with resilient devices control the relationship between the relative movements of some or most of the members forming the force transmission lines to the front and rear wheel braking appliances.

The invention also consists in improvements in or relating to wheel brakes for vehicles as hereinafter described.

Referring now to the accompanying drawings:—

Figures 3 and 4 show in plan and elevation the pedal and other shafts for a brake gear somewhat different from that indicated in Figure 1;

Figures 6 and 7 show in plan and elevation a gear operating on the same principle as that shown in Figure 5 but in a somewhat modified form.

Figure 1:
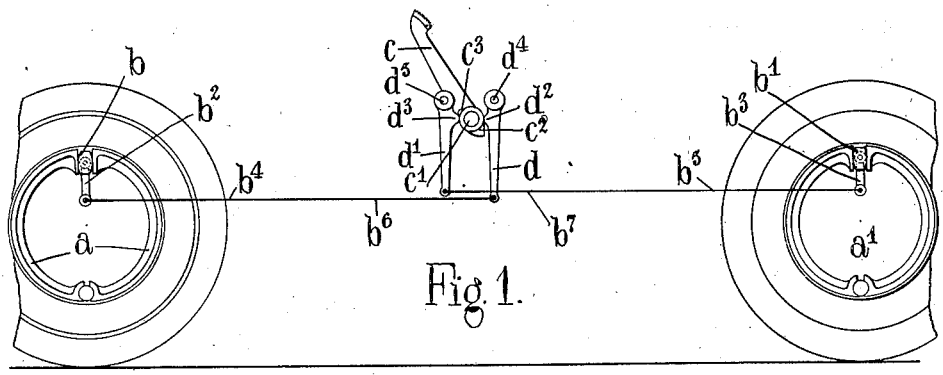
Figure 1 is a diagrammatic representation of a vehicle with brake gear in accordance with the invention fitted thereto.

In carrying out the invention as shown diagrammatically in Figure 1 the expanding brakes $a$ and $a'$ at the front and rear of the vehicle respectively are applied by means of blocks or the like $b$, $b'$ fitted between the ends of the expanding shoes and which are turned by horizontal torque shafts having lever arms $b^2$, $b^3$ at the ends thereof.

A pedal lever $c$ is employed for applying power to the brakes by means of the transverse shaft $c'$ upon which a series of two or four cams $c^2$ for the front wheels and $c^3$ for the rear wheels is carried. The cams $c^2$ and $c^3$ are shown more clearly in Figure 2 and these co-operate with projections $d^2$ $d^3$ upon depending levers $d$ $d'$ upon each side of the shaft. the cams and levers $c^2$, $d$ being in duplicate for the front wheels and the cams and levers $c^3$ $d'$ being in duplicate for the back wheels. The levers $d$, $d'$ are pivoted at their upper ends by shafts or the like $d^4$ $d^5$.

The levers $d$, $d'$ which extend considerably further below than above the cam centers are connected at their lower ends by tension rods $b^4$, $b^5$ with the lever arms $b^2$, $b^3$ and situated at some convenient position $b^6$, $b^7$ in the length of these tension rods are resilient devices of definitely determined resilience so that for a given movement of the levers $d$, $d'$ and consequent extension of the said resilient devices determined forces will be exerted upon the lever arms $b^2$, $b^3$.

It will be understood that although single references are given for the parts connecting respectively with the front and back of the vehicle, these parts may all be provided in duplicate so that there is one set for each of the wheels where a four-wheel vehicle is concerned.

The cams $c^2$ for actuating the levers $d$ connected to the front wheel brakes of the vehicle are capable of imparting to the lower ends of these levers a movement which is eight times the movement imparted to the ends of the levers $d'$ by the cams $c^3$ for the rear end of the vehicle and the resilient devices $b^6$ for the front end must consequently be capable of undergoing a deflection which is eight times as great as that imparted to the resilient means $b^7$ for the rear end of the vehicle.

In this way the resilient devices for the front wheels when fully extended will be capable of exerting upon the front wheel braking devices eight times the load which can be exerted upon the rear wheel braking devices. This assumes that the resilient devices for both the front and rear wheels are deflected to a similar amount by similar loads or in other words have a similar stiffness; the one, however, is capable of a much greater deflection than the other.

The cams $c^3$ for the rear wheel braking devices are so formed that the levers $d'$ are carried through their total range of movement during the first half of the total movement of the pedal lever $c$ and during the latter half of this movement the lever $d'$ is returned to its original position so that after the pedal has moved through its total travel no load will be exerted upon the rear wheel braking devices. The cams $c^2$ for the front wheel braking appliances are of such a form that the levers $d$ will be moved continuously through the whole of the possible movement of the pedal lever $c$, namely while the back wheel devices are being subjected to maximum load and the load is again removed therefrom.

The resilient devices as will be understood will commence movement from a practically unstressed condition but it will, of course, be necessary to arrange these resilient devices so that they are readily capable of overcoming the much lighter force which may be exerted by any hold-off or release springs which may be fitted to the brakes.

It may be assumed that the total movement of the brake pedal would be through an angle of about 30° and the relationship between the apportionment of the force between the front and back wheels has been based upon a vehicle with a wheel base equivalent to four times the height of the centre of gravity of the vehicle above the ground, the centre of gravity also lying midway between the axes of the front and rear wheels.

Figure 8:
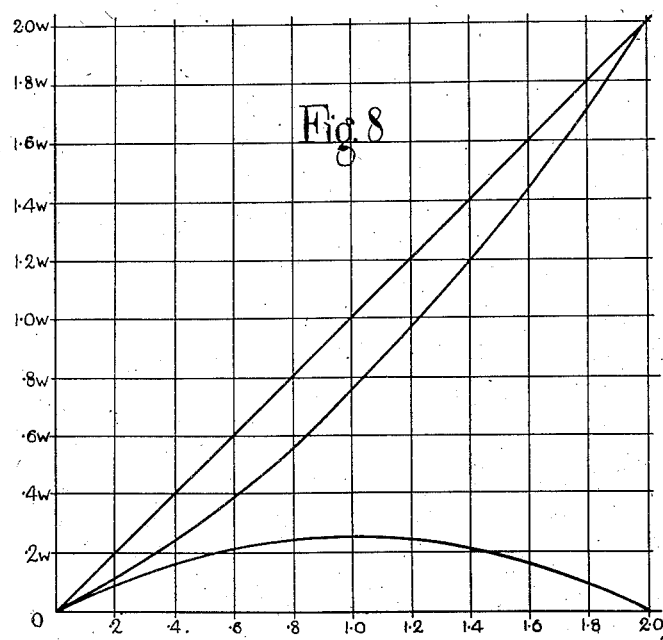
Figure 8 is a diagram showing the apportionment of braking effort between front and rear wheels.

In order to overcome the effects of maladjustment the depending levers are given a considerable leverage, say of five to one or even about ten to one ratio between the length from the fulcrum to the end of the lever and the length from the fulcrum to the abutment with which the cam co-operates, and the shape of the cam surfaces may be such that the apportionment of the total braking effort between the front and rear wheel brakes will be as shown in the diagram Figure 8 where the deflection of the front wheel resilient devices will equal about three times the deflection of the back wheel resilient devices at the time that the deflection of the latter has reached a maximum as shown at X, the back wheel deflection decreasing from this point to zero while the front wheel deflection increases from this point until it has reached as shown at Y a value of eight times the maximum deflection given to the rear wheel devices.

Figures 2, 5:
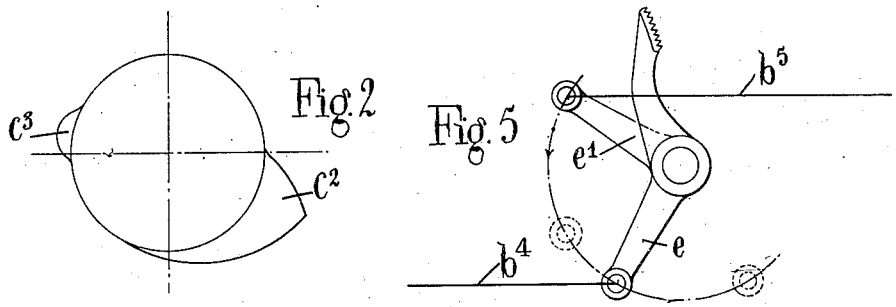
Figure 2 is an outline of a cam suitable for an arrangement such as Figure 1.
Figure 5 is a diagram showing how the invention may be applied by means other than cams.

Instead of the cams shown in Figure 2, cranks as shown diagrammatically in Figure 5 may be employed and such cranks may be moved through the same angular movement as the pedal lever or may be geared up so as to move through a greater angle. The crank $e$ in Figure 5 which operates a front wheel braking device should be at its mid position when nearly at right angles to the rod $b^4$ which it operates while the crank $e'$ which operates the rod $b^5$ for a back wheel should, when in its mid position, be in line with the rod $b^5$, that is, this crank moves an equal distance upon each side of its dead centre when passing from one end to the other of its travel, while the dead centre of this back brake crank corresponds to the half-way position of the front wheel crank.

In the arrangement shown in Figures 3 and 4, the central shaft $f$ journalled at each side on the chassis frame $g$ carries the pedal arm $f'$ and cams $f^2$, $f^3$, while the two shafts $h$ and $i$ upon each side of the centre shaft and also journalled in the chassis frame $g$ carry the projections $h'$ and $i'$ for coacting respectively with the cams $f^2$ and $f^3$, the cams and projections being in each case positioned midway between the end journals of the shafts. The shafts $i$ and $h$ also carry at each end adjacent to the chassis framing the lever arms $h^2$, $h^3$ and $i^2$, $i^3$ which are connected at their lower ends with the tension rods $j$, $j'$ and $k$, $k'$ which are, as in the previously described construction, provided with resilient devices $j^2$, $j^3$, $k^2$, $k^3$, the said resilient devices as shown comprising a tube $k^3$ having an inturned flange $k^4$ at one end and an internal thread at the other end into which is screwed a collar $k^5$ which is also in turn screwed upon the end of the continuation portion $k^6$ of the tension rod $k'$.

A coiled spring $k^7$ surrounds the portion of the rod $k'$ which extends into the tube or box $k^3$ and upon the rod is a nut or collar $k^8$ engaging the end of the spring. In other respects this construction is the same as that already described in connection with Figures 1 and 2.

The form of the invention shown in Figures 6 and 7 is generally similar to that described in connection with Figure 5 but the crank for operating the rear wheel brakes is upon the rear instead of upon the front side of the centre line of the pedal shaft.

The pedal shaft $l$ is journalled at each end in the chassis frame $g$ and carries the pedal lever $l'$ and adjacent its opposite ends the two cranks $m$, $m'$ for the front wheel brakes.

In the centre of the shaft $l$ is the crank $n$ for operating the rear wheel brakes and this crank has attached to its end a cylindrical member $n'$ telescoping within a second hollow cylindrical member $n^2$. The member $n'$ carries a flange or collar $n^3$ while the member $n^2$ carries a similar collar $n^4$ and between these collars is situated a spring $n^5$ constituting the resilient device for the two back wheel brakes. The resilient devices $m^2$, $m^3$ inserted in the rods $m^4$, $m^5$ for the front wheel brakes may be the same construction as described in connection with Figures 3 and 4.

The member $n^2$ of the resilient device for the back wheel brakes is connected to the lever arm $o'$ projecting from the centre of a second transverse shaft $o$ which carries adjacent each end longer arms $o^2$ and $o^3$ connected to tension rods $o^4$ and $o^5$ for the back wheel braking devices.

It is to be understood that the constructions hereinbefore described are given by way of example only and that many modifications and additions may be introduced without in any way departing from the spirit of this invention.

Having now described my invention, what I claim as new and desire to secure by Letters Patent is:—

1. A method of applying vehicle wheel brakes and dividing the energy bestowed on a brake control power application member by apportioning means and resilient devices to exert first substantially equal gripping forces on the wheel brakes at both ends with a rapidly increasing predominance of the forces at the front end as the total power applied increases until the back wheel gripping forces reach a maximum when about one-half of the final braking power has been applied after which a reduction of the force transmitted to the back wheels commences and continues until when the whole of the total braking power is applied all the force is transmitted to the front wheel brakes.

2. A braking gear for applying braking forces to the wheels on both the forward and rear ends of a vehicle comprising a brake control power-application member, cam members operated thereby, members forming the force transmission lines to the front and rear wheel braking appliances and resilient means controlling the relationship between the relative movements of said transmission members.

3. A braking gear for wheels at the front and rear of a vehicle comprising a brake control power-application member, braking appliances on the front and rear wheels, force transmission lines to the front and rear wheel braking appliances resilient means inserted in the transmission lines, cam means operating the rear wheel device adapted during half the pedal movement to increase the gripping force to about a maximum and release it in the other half and cam means operating the front wheel device which increases the gripping force to about three times the said maximum in the first half and to about eight times by the end of the other half.

4. A braking gear for operating in accordance with the method claimed in claim 1 and comprising independent sets of cam members in combination with resilient means for operating the front and the rear wheel braking appliances, said resilient means for the two ends of the vehicle being deformed to a substantially similar extent by similar loads, and those for the front end being capable of sustaining about eight times the deformation imparted to those for the back end.

5. A braking gear for wheels at the front and rear of a vehicle comprising a brake control power-application member, braking appliances on the front and rear wheels, force transmission lines to the front and rear wheel braking appliances, resilient means inserted in the transmission lines, cam means operating the rear wheel device adapted during half the pedal movement to increase the gripping force to about a maximum and release it in the other half, and cam means operating the front wheel device which increases the gripping force to about three times the said maximum in the first half and to about eight times by the end of the other half, said resilient means for the two ends of the vehicle being deformed to a substantially similar extent by similar loads and those for the front end being capable of sustaining about eight times the deformation imparted to those for the back end.

6. A braking gear for use at the front and rear of a vehicle comprising a brake control power application member, cams operated thereby, levers which co-operate with said cams, force transmission lines extending from said levers to the front and rear wheel braking appliances, and resilient means inserted in said force transmission lines, the rear wheel cam and lever device being adapted during half the pedal movement to increase the gripping force to about a maximum and release it in the other half while the front wheel cam and lever device increases the gripping force to about three times the said maximum in the first half and to about eight times by the end of the other half, the resilient means for the two ends of the vehicle being deformed to a substantially similar extent by similar loads and those for the front transmission lines being capable of sustaining about eight times the deformation imparted to those for the back end.

7. A braking gear for applying braking forces to the wheels on both the forward and rear ends of a vehicle comprising a brake-control power-application member, cam members operated thereby, two-arm movement-multiplying levers operated by said cams, members forming force transmission lines from said levers to the front and rear wheel braking appliances and resilient means co-operating with said transmission members to exert different braking forces at the two ends during various periods of the braking operation.

8. A braking gear for wheels at the front and rear of a vehicle comprising a brake control power-application member, braking appliances on the front and rear wheels, force transmission lines to the front and rear wheel braking appliances, resilient means inserted in the transmission lines, levers actuating said transmission lines, cam means operating the rear wheel actuating lever and adapted during half the pedal movement to increase the brake gripping force to about a maximum and release it in the other half, and cam means operating the front wheel actuating lever which increases the gripping force to about three times the said maximum in the first half and to about eight times by the end of the other half.

9. A braking gear for wheels at the front and rear of a vehicle comprising a brake control power-application member, braking appliances on the front and rear wheels, force transmission lines to the front and rear wheel braking appliances, resilient means similarly deformed by similar loads inserted in the transmission lines, levers actuating said transmission lines, cam means operating the rear wheel actuating lever and adapted during half the pedal movement to increase the brake gripping force to about a maximum and release it in the other half, and cam means operating the front wheel actuating lever which increases the gripping force to about three times the said maximum in the first half and to about eight times by the end of the other half, the front resilient means being capable of sustaining about eight times the deformation imparted to those for the back end.

10. A braking gear for applying braking forces to the wheels on both the forward and rear ends of a vehicle comprising a brake control power-application member, cam members operated thereby, levers adapted to increase the actual cam movement by several times operated by said cams, members forming force transmission lines from said levers to the front and rear wheel braking appliances and resilient means inserted in said transmission lines to vary the braking forces at the front end from those at the back.

In testimony whereof I have signed my name to this specification.

JOHN VERNON PUGH.